US006567596B2

(12) United States Patent
Kato et al.

(10) Patent No.: US 6,567,596 B2
(45) Date of Patent: May 20, 2003

(54) OPTICAL FIBER SUITABLE FOR USE IN WDM TRANSMISSION SYSTEM

(75) Inventors: Takatoshi Kato, Yokohama (JP); Masashi Onishi, Yokohama (JP); Yuji Kubo, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 206 days.

(21) Appl. No.: 09/732,884

(22) Filed: Dec. 11, 2000

(65) Prior Publication Data

US 2001/0006572 A1 Jul. 5, 2001

(30) Foreign Application Priority Data

Dec. 13, 1999 (JP) .............................. 11-353262

(51) Int. Cl.$^7$ ................................................. G02B 6/02
(52) U.S. Cl. ...................................... 385/123; 385/124
(58) Field of Search ............................... 385/123–127, 385/128

(56) References Cited

U.S. PATENT DOCUMENTS

| 5,553,185 A | 9/1996 | Antos et al. ............. 385/127 |
| 5,684,909 A | 11/1997 | Liu .......................... 385/127 |
| 6,337,942 B1 * | 1/2002 | Kato et al. ............... 385/127 |

FOREIGN PATENT DOCUMENTS

EP     0 883 002 A1    12/1998

* cited by examiner

*Primary Examiner*—Lynn D. Feild
*Assistant Examiner*—Son V. Nguyen
(74) *Attorney, Agent, or Firm*—McDermott, Will & Emery

(57) ABSTRACT

An optical fiber that can sufficiently suppress the generation of four-wave mixing and that can widen the bandwidth of wavelength of signal light. The optical fiber of the present invention has (a) a chromatic dispersion whose absolute value is not less than 8 ps·nm$^{-1}$·km$^{-1}$ and not more than 15 ps·nm$^{-1}$·km$^{-1}$ at a wavelength of 1.55 $\mu$m and (b) a dispersion slope whose absolute value is not more than 0.05 ps·nm$^{-2}$·km$^{-1}$ at a wavelength of 1.55 $\mu$m. It is more desirable that the optical fiber have (a) a chromatic dispersion whose absolute value is not less than 8 ps·nm$^{-1}$·km$^{-1}$ and not more than 12 ps·nm$^{-1}$·km$^{-1}$ at a wavelength of 1.55 $\mu$m, (b) a dispersion slope whose absolute value is not more than 0.03 ps·nm$^{-2}$·km$^{-1}$ at a wavelength of 1.55 $\mu$m, (c) a chromatic dispersion whose absolute value is not less than 5 ps·nm$^{-1}$·km$^{-1}$ at wavelengths between 1.45 and 1.65 $\mu$m, (d) an effective area not less than 45 $\mu$m$^2$ at a wavelength of 1.55 $\mu$m, and (e) a two-meter cutoff wavelength not less than 1.40 $\mu$m.

10 Claims, 3 Drawing Sheets

OPTICAL FIBER SUITABLE FOR USE IN WDM TRANSMISSION SYSTEM

BACKGROUND OF THE INVENTION

1. Field of the Invention

The present invention relates to an optical fiber suitable for the optical transmission line in a wavelength-division-multiplexing (WDM) transmission system.

2. Related Background Arts

WDM transmission systems can transmit a large volumes of information at a high rate by using signal light having a multitude of wavelengths in a 1.55 μm wavelength band. In a WDM transmission system, it is essential to increase the absolute value of the chromatic dispersion of the optical transmission line for suppressing the generation of nonlinear optical phenomena, especially four-wave mixing, and to decrease the absolute value of the dispersion slope of the optical transmission line for widening the bandwidth of wavelength of signal light.

An example of optical fibers for the optical transmission line in a WDM transmission system is a single-mode optical fiber stipulated in THE ITU G 652 Standard. The single-mode optical fiber has a chromatic dispersion as comparatively large as about 17 ps·nm$^{-1}$·km$^{-1}$ at a wavelength of 1.55 μm, so that it can suppress the generation of four-wave mixing. The optical fiber, however, has a dispersion slope as comparatively large as about 0.056 ps·nm$^{-2}$·km$^{-1}$ at a wavelength of 1.55 μm, so that it has no wide bandwidth of wavelength of signal light.

As other examples, the U.S. Pat. No. 5,684,909 and the published European Patent Application EP0883 002A1 disclose dispersion-flattened optical fibers that have a reduced dispersion slope at a wavelength of 1.55 μm. The dispersion-flattened optical fibers have a desirable dispersion slope as small as not more than 0.05 ps·nm$^{-2}$·km$^{-1}$ at a wavelength of 1.55 μm. The optical fibers, however, have a chromatic dispersion as small as about 1 ps·nm$^{-1}$·km$^{-1}$ at a wavelength of 1.55 μm, so that they cannot sufficiently suppress the generation of four-wave mixing.

SUMMARY OF THE INVENTION

An object of the present invention is to offer an optical fiber that can sufficiently suppress the generation of four-wave mixing and that can widen the bandwidth of wavelength of signal light.

In order to achieve this object and other objects as well, the present invention offers an optical fiber that has a chromatic dispersion whose absolute value is not less than 8 ps·nm$^{-1}$·km$^{-1}$ and not more than 15 ps·nm$^{-1}$·km$^{-1}$ at a wavelength of 1.55 μm and that has a dispersion slope whose absolute value is not more than 0.05 ps·nm$^{-2}$·km$^{-1}$ at a wavelength of 1.55 μm.

In an embodiment, the optical fiber of the present invention comprises the following regions:

(a) a first core region that includes the optical central axis and that has a first refractive index;
(b) a second core region that surrounds the first core region and that has a second refractive index that is smaller than the first refractive index;
(c) a third core region that surrounds the second core region and that has a third refractive index that is larger than the second refractive index; and
(d) a cladding region that surrounds the third core region and that has a fourth refractive index that is smaller than the third refractive index.

The description below, together with the accompanying drawings, gives a detailed explanation of the foregoing objects and the novel features of the present invention. It is to be understood that the accompanying drawings are provided for illustrating the present invention rather than for limiting the scope of application of the present invention.

DESCRIPTION OF THE PREFERRED EMBODIMENTS

Figure 2:
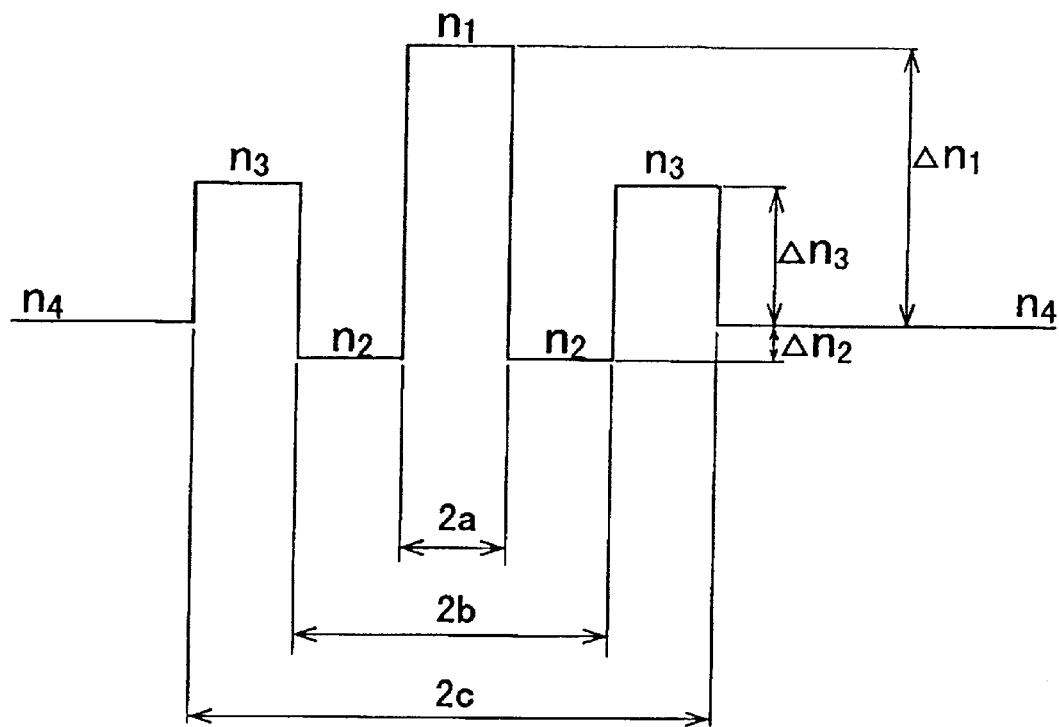
FIG. 2 is a diagram showing an example of a desirable refractive-index profile for the optical fiber of the present invention.
Figure 3:
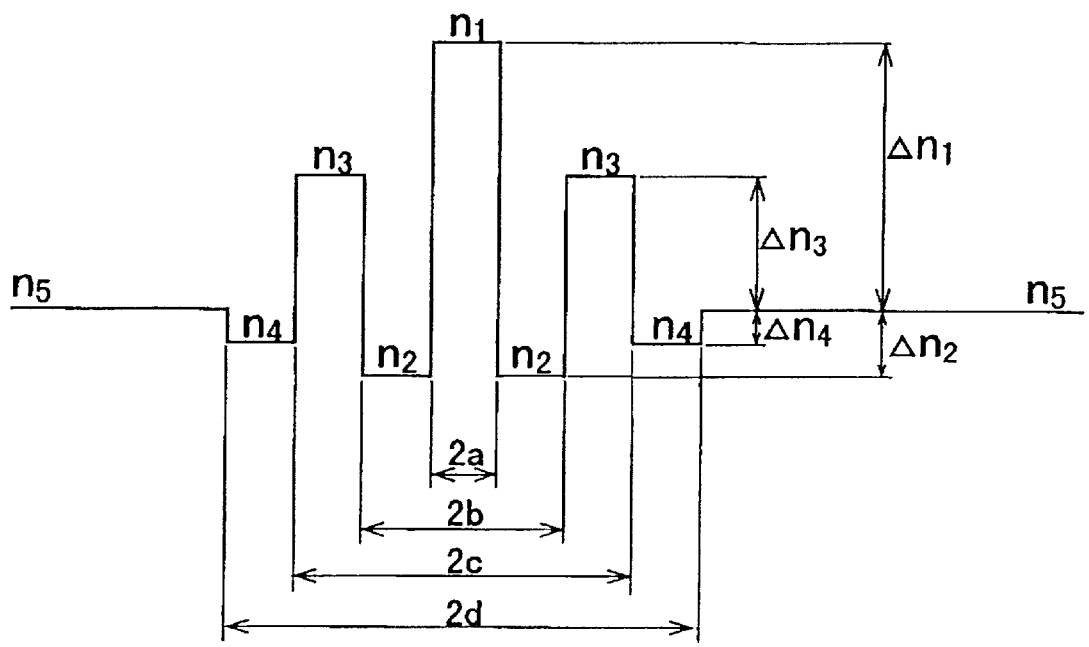
FIG. 3 is a diagram showing another example of a desirable refractive-index profile for the optical fiber of the present invention.

The preferred embodiments of the present invention are described below by referring to the accompanying drawings. In FIGS. 2 and 3, the same reference letters and numerals are given to the same regions of the optical fibers to the extent applicable to eliminate duplicated explanations. In these figures, the height and width are partly exaggerated to the extent that they do not necessarily correspond to the actual refractive indices and dimensions.

Figure 1:
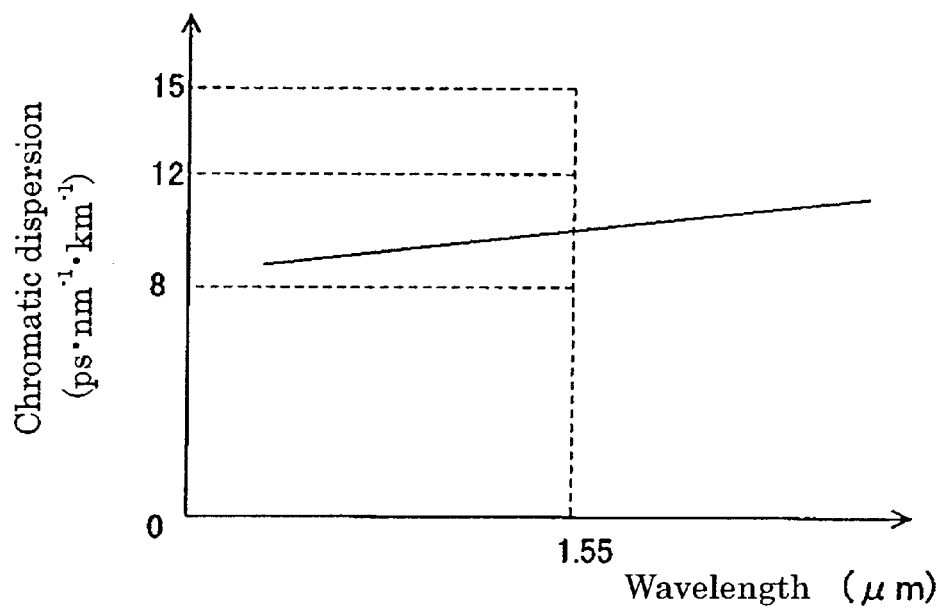
FIG. 1 is a graph showing the relationship between chromatic dispersion and wavelengths in the optical fiber of the present invention.

As shown in FIG. 1, the optical fiber of the present invention has a chromatic dispersion whose absolute value is not less than 8 ps·nm$^{-1}$·km$^{-1}$ and not more than 15 ps·nm$^{-1}$·km$^{-1}$ at a wavelength of 1.55 μm. The absolute value of the chromatic dispersion not less than 8 ps·nm$^{-1}$·km$^{-1}$ enables the suppression of the generation of four-wave mixing. The absolute value of the chromatic dispersion not more than 15 ps·nm$^{-1}$·km$^{-1}$ enables the suppression of the waveform degradation caused by the interaction between nonlinear optical phenomena and the cumulative dispersion. In optical transmission system at a bit rate more than 40 Gb·s$^{-1}$, in particular, the limitation by the waveform degradation becomes more severe. Therefore, it is more desirable that a absolute value of the chromatic dispersion be not more than 12 ps·nm$^{-1}$·km$^{-1}$.

It is desirable that the optical fiber of the present invention have a dispersion slope whose absolute value is not more than 0.05 ps·nm$^{-2}$·km$^{-1}$ at a wavelength of 1.55 μm, more desirably not more than 0.03 ps·nm$^{-2}$·km$^{-1}$. A absolute value of the dispersion slope not more than 0.05 ps·nm$^{-2}$·km$^{-1}$ enables the widening of the bandwidth of wavelength of signal light.

It is desirable that the optical fiber of the present invention have a chromatic dispersion whose absolute value is not less than 5 ps·nm$^{-1}$·km$^{-1}$ at wavelengths between 1.45 and 1.65 μm. The wavelength domain includes the S-band between 1.45 and 1.53 μm, the C-band between 1.53 and 1.56 μm, and the L-band between 1.56 and 1.65 μm. The foregoing large absolute value of chromatic dispersion in such a wide wavelength domain enables the suppression of the generation of four-wave mixing throughout the wide bandwidth of wavelength of signal light, thereby enabling large-capacity optical communication.

In order to suppress the generation of four-wave mixing, it is desirable that the optical fiber of the present invention have an effective area not less than 45 $\mu m^2$ at a wavelength of 1.55 $\mu m$, more desirably not less than 50 $\mu m^2$.

The optical fiber of the present invention is required to be a single-mode type in the bandwidth of wavelength of signal light. A small bend loss is also important to suppress an increase in loss at the time of cabling. Consequently, it is desirable that the cutoff wavelength be not less than 1.40 $\mu m$ in terms of a two-meter cutoff wavelength $\lambda_c$, more desirably not less than 1.60 $\mu m$. A cutoff wavelength shortens with increasing length of a transmission line. Therefore, when a transmission line has a length of hundreds of meters or more, even a two-meter cutoff wavelength $\lambda_c$ of about 2.0 $\mu m$, which is longer than the wavelength of signal light, satisfies the single-mode conditions in the bandwidth of wavelength of signal light, posing no practical problems. The term "a two-meter cutoff wavelength $\lambda_c$" is used to mean a cutoff wavelength in an $LP_{11}$ mode when an optical fiber, two meters in length, makes one complete turn having a radius of 140 mm with no tension being applied.

FIG. 2 is a diagram showing an example of a desirable refractive-index profile for the optical fiber of this embodiment. The optical fiber comprises the following regions:

(a) a first core region that includes the optical central axis and that has the refractive index $n_1$;

(b) a second core region that surrounds the first core region and that has the refractive index $n_2$;

(c) a third core region that surrounds the second core region and that has the refractive index $n_3$; and (d) a cladding region that surrounds the third core region and that has the refractive index $n_4$.

The relationships in magnitude between these refractive indices are $n_1 > n_2$, $n_2 < n_3$, and $n_3 > n_4$. In FIG. 2, the outer diameter of the first core region is represented by 2a, the outer diameter of the second core region by 2b, and the outer diameter of the third core region by 2c. The refractive index of the cladding region, $n_4$, being used as a reference, the relative refractive-index difference of the first core region is represented by $\Delta n_1$, the relative refractive-index difference of the second core region by $\Delta n_2$, and the relative refractive-index difference of the third core region by $\Delta n_3$.

FIG. 3 is a diagram showing another example of a desirable refractive-index profile for the optical fiber of this embodiment. The optical fiber comprises the following regions:

(a) a first core region that includes the optical central axis and that has the refractive index $n_1$;

(b) a second core region that surrounds the first core region and that has the refractive index $n_2$;

(c) a third core region that surrounds the second core region and that has the refractive index $n_3$;

(d) an inner cladding region that surrounds the third core region and that has the refractive index $n_4$; and (e) an outer cladding region that surrounds the inner cladding region and that has the refractive index $n_5$.

The relationships in magnitude between these refractive indices are $n_1 > n_2$, $n_2 < n_3$, $n_3 > n_4$, and $n_4 < n_5$. In FIG. 3, the outer diameter of the first core region is represented by 2a, the outer diameter of the second core region 2b, the outer diameter of the third core region 2c, and the outer diameter of the inner cladding region 2d. The refractive index of the outer cladding region, $n_5$, being used as a reference, the relative refractive-index difference of the first core region is represented by $\Delta n_1$, the relative refractive-index difference of the second core region by $\Delta n_2$, the relative refractive-index difference of the third core region by $\Delta n_3$, and the relative refractive-index difference of the inner cladding region by $\Delta n_4$.

Examples of optical fibers in this embodiment are explained below. Table 1 summarizes the dimensions and characteristics of the optical fibers of the individual examples.

TABLE 1

| Example No. | | 1 | 2 | 3 | 4 | 5 | 6 | 7 | 8 |
|---|---|---|---|---|---|---|---|---|---|
| $\Delta n_1$ (%) | | 0.44 | 0.40 | 0.45 | 0.46 | 0.44 | 0.44 | 0.58 | 0.44 |
| $\Delta n_2$ (%) | | 0.00 | −0.05 | −0.10 | −0.20 | −0.08 | −0.10 | −0.10 | −0.10 |
| $\Delta n_3$ (%) | | 0.13 | 0.15 | 0.19 | 0.26 | 0.18 | 0.18 | 0.22 | 0.16 |
| $\Delta n_4$ (%) | | — | −0.05 | −0.10 | −0.20 | −0.08 | −0.10 | −0.10 | −0.10 |
| 2a ($\mu m$) | | 7.0 | 7.6 | 6.7 | 6.4 | 7.0 | 6.8 | 5.1 | 6.8 |
| 2b ($\mu m$) | | 20.8 | 16.3 | 18.9 | 22.7 | 18.7 | 17.8 | 14.0 | 17.8 |
| 2c ($\mu m$) | | 32.0 | 25.5 | 29.5 | 32.4 | 29.2 | 29.9 | 23.5 | 26.8 |
| 2d ($\mu m$) | | — | 38.0 | 44.0 | 48.4 | 43.6 | 44.6 | 35.0 | 44.6 |
| Zero disp. wavelength $\lambda_0$ (nm) | | 1329 | 1330 | 1331 | 1316 | 1327 | 1339 | 1700 | 1333 |
| Chromatic dispersion (ps · $nm^{-1}$ · $km^{-1}$) | at 1450 nm | 8.2 | 7.5 | 6.8 | 8.4 | 7.4 | 5.6 | −13.4 | 6.6 |
| | at 1550 nm | 13.5 | 12.5 | 10.5 | 11.9 | 11.6 | 8.4 | −12.4 | 10.3 |
| | at 1650 nm | 18.0 | 17.1 | 12.6 | 10.6 | 14.5 | 9.7 | −5.6 | 12.7 |
| Dispersion slope (ps · $nm^{-2}$ · $km^{-1}$)[1] | | 0.048 | 0.047 | 0.027 | 0.015 | 0.034 | 0.018 | 0.037 | 0.029 |
| Effective area ($\mu m^2$)[1] | | 63.4 | 69.2 | 54.1 | 45.5 | 57.3 | 57.2 | 55.2 | 55.8 |
| Bend loss (dB)[2] | | 0.003 | 0.020 | 0.050 | 0.470 | 0.020 | 0.007 | 0.150 | 0.060 |
| $\lambda_c$ (nm) | | 1780 | 1430 | 1730 | 1820 | 1710 | 1850 | 1720 | 1630 |

Note [1]: at 1550 nm.
Note [2]: at 1550 nm, with one complete turn having a diameter of 32 mm.

The optical fiber of Example 1 has the refractive-index profile shown in FIG. 2; the optical fibers of Examples 2 to 8 have the refractive-index profile shown in FIG. 3.

All the optical fibers of Examples 1 to 8 have the following characteristics:

(a) a chromatic dispersion whose absolute value is not less than 8 ps·nm$^{-1}$·km$^{-1}$ and not more than 15 ps·nm$^{-1}$·km$^{-1}$ at a wavelength of 1.55 µm;

(b) a dispersion slope whose absolute value is not more than 0.05 ps·nm$^{-2}$·km$^{-1}$ at a wavelength of 1.55 µm;

(c) a chromatic dispersion whose absolute value is not less than 5 ps·nm$^{-1}$·km$^{-1}$ at wavelengths between 1.45 and 1.65 µm;

(d) an effective area not less than 45 µm$^2$ at a wavelength of 1.55 µm; and (e) a two-meter cutoff wavelength $\lambda_c$ not less than 1.40 µm.

Table 1 also shows the following results:

(a) The optical fibers of Examples 3 to 6 and 8 have a chromatic dispersion whose absolute value is between 8 and 12 ps·nm$^{-1}$·km$^{-1}$ at a wavelength of 1.55 µm.

(b) The optical fibers of Examples 3, 4, 6, and 8 have a dispersion slop whose absolute value is not more than 0.03 ps·nm$^{-2}$·km$^{-1}$ at a wavelength of 1.55 µm.

(c) The optical fibers of Examples 1 to 3 and 5 to 8 have an effective area not less than 50 µm$^2$ at a wavelength of 1.55 µm.

(d) The optical fibers of Examples 1 and 3 to 8 have a two-meter cutoff wave-length $\lambda_c$ not less than 1.60 µm.

Figure 4:
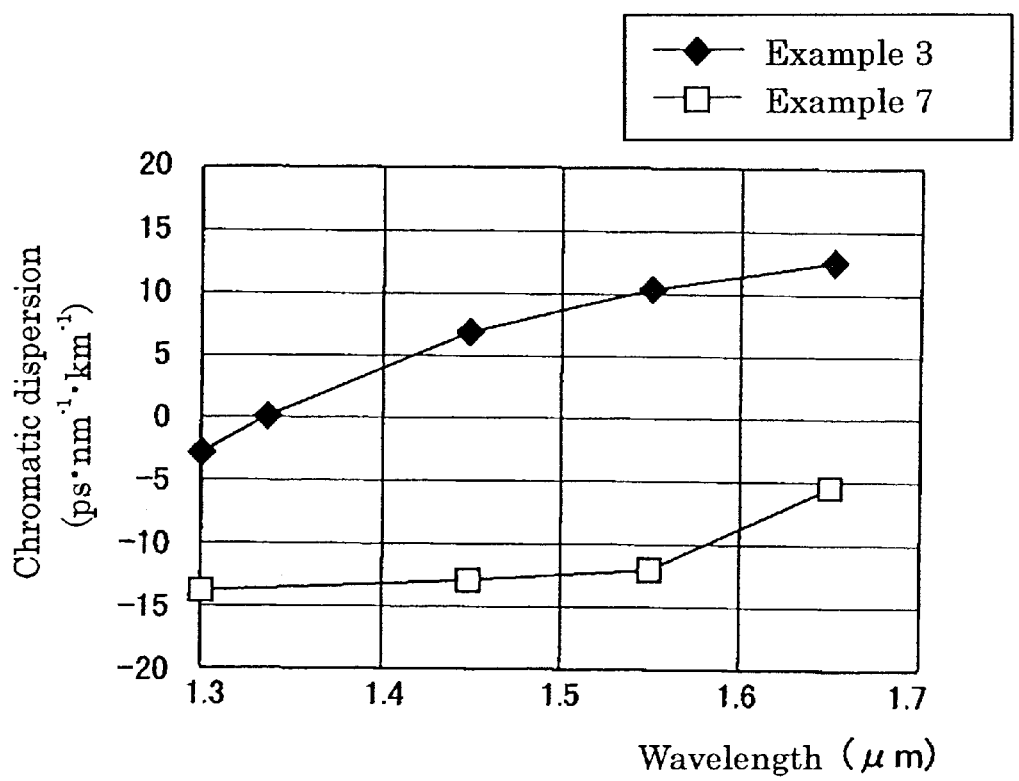
FIG. 4 is a graph showing the relationship between chromatic dispersion and wavelengths in the optical fibers of Examples 3 and 7 of the present invention.

As shown in FIG. 4, the optical fibers of Examples 3 and 7 have a chromatic dispersion whose sign is opposite each other at a wavelength of 1.55 µm. The combination of the two optical fibers enables a reduction in the absolute value of the average chromatic dispersion as a whole, thereby reducing the absolute value of the cumulative chromatic dispersion. Furthermore, the combination of two optical fibers of the present invention that have a chromatic dispersion whose sign is opposite each other at a wavelength of 1.55 µm and that have a dispersion slope whose sign is opposite each other at a wavelength of 1.55 µm enables a reduction in the absolute value of the average chromatic dispersion as a whole in a wider bandwidth of wavelength, thereby reducing the absolute value of the cumulative chromatic dispersion in a wider bandwidth of wavelength.

What is claimed is:

1. An optical fiber having:

(a) a chromatic dispersion whose absolute value is not less than 8 ps·nm$^{-1}$·km$^{-1}$ and not more than 15 ps·nm$^{-1}$·km$^{-1}$ at a wavelength of 1.55 µm; and (b) a dispersion slope whose absolute value is not more than 0.05 ps·nm$^{-2}$·km$^{-1}$ at a wavelength of 1.55 µm.

2. The optical fiber as defined in claim 1, having a chromatic dispersion whose absolute value is not less than 8 ps·nm$^{-1}$·km$^{-1}$ and not more than 12 ps·nm$^{-1}$·km$^{-1}$ at a wavelength of 1.55 µm.

3. The optical fiber as defined in claim 1, having a dispersion slope whose absolute value is not more than 0.03 ps·nm$^{-2}$·km$^{-1}$ at a wavelength of 1.55 µm.

4. The optical fiber as defined in claim 1, having a chromatic dispersion whose absolute value is not less than 5 ps·nm$^{-1}$·km$^{-1}$ at wavelengths between 1.45 and 1.65 µm.

5. The optical fiber as defined in claim 1, having an effective area not less than 45 µm$^2$ at a wavelength of 1.55 µm.

6. The optical fiber as defined in claim 5, having an effective area not less than 50 µm$^2$ at a wavelength of 1.55 µm.

7. The optical fiber as defined in claim 1, having a two-meter cutoff wavelength not less than 1.40 µm.

8. The optical fiber as defined in claim 7, having a two-meter cutoff wavelength not less than 1.60 µm.

9. The optical fiber as defined in claim 1, comprising:

(a) a first core region that includes the optical central axis and that has a first refractive index;

(b) a second core region that surrounds the first core region and that has a second refractive index that is smaller than the first refractive index;

(c) a third core region that surrounds the second core region and that has a third refractive index that is larger than the second refractive index; and (d) a cladding region that surrounds the third core region and that has a fourth refractive index that is smaller than the third refractive index.

10. The optical fiber as defined in claim 9, wherein the cladding region comprises:

(a) an inner cladding region that surrounds the third core region; and (b) an outer cladding region that surrounds the inner cladding region and has a refractive index that is larger than the refractive index of the inner cladding region.

\* \* \* \* \*